No. 727,076. PATENTED MAY 5, 1903.
R. W. BROOKS.
VEHICLE TIRE.
APPLICATION FILED OCT. 6, 1902.
NO MODEL.
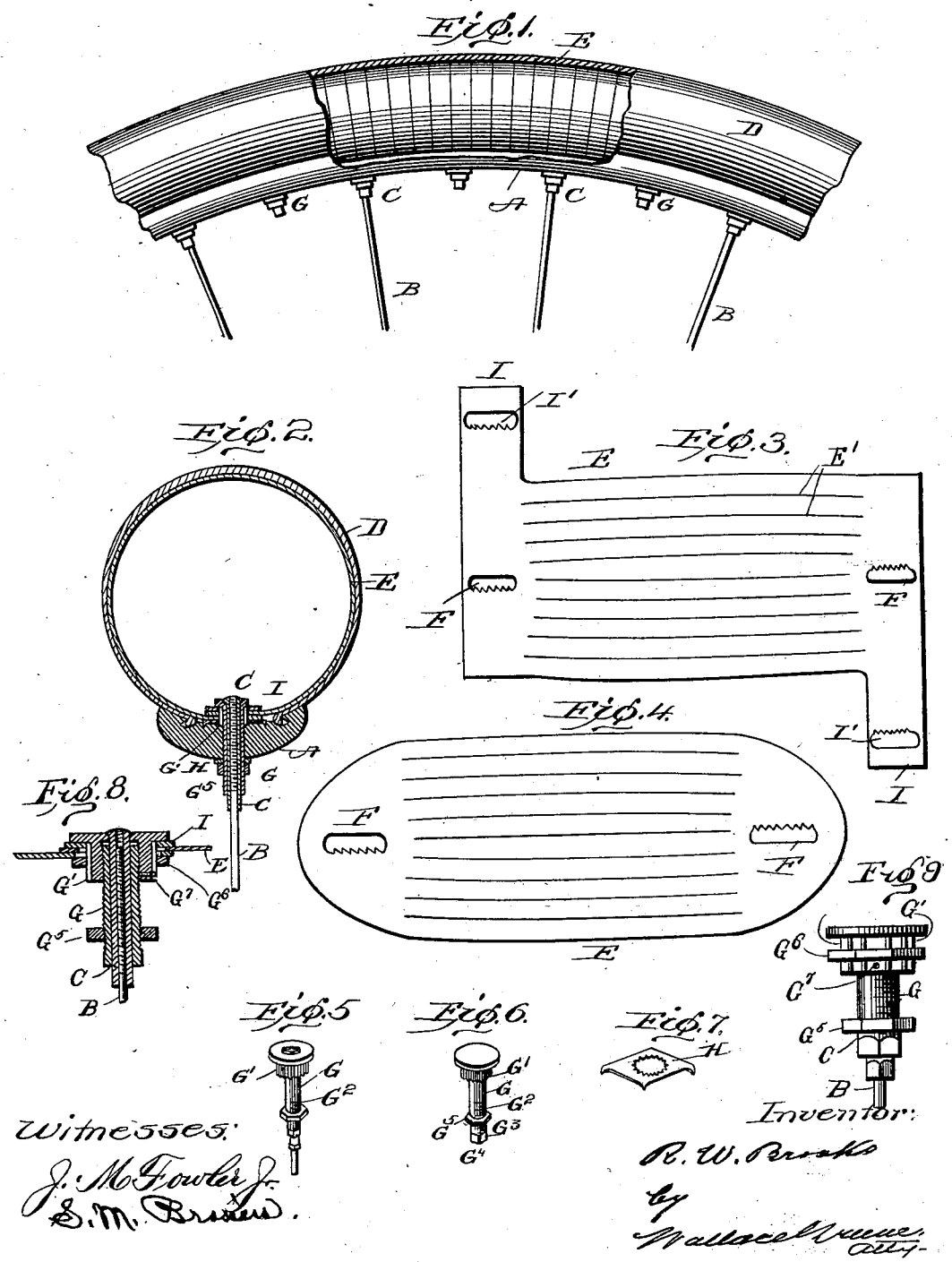

No. 727,076.                                    Patented May 5, 1903.

UNITED STATES PATENT OFFICE.

RUFUS W. BROOKS, OF PORTSMOUTH, VIRGINIA.

VEHICLE-TIRE.

SPECIFICATION forming part of Letters Patent No. 727,076, dated May 5, 1903.

Application filed October 6, 1902. Serial No. 126,118. (No model.)

*To all whom it may concern:*

Be it known that I, RUFUS W. BROOKS, a citizen of the United States, residing at Portsmouth, in the county of Norfolk and State of Virginia, have invented certain new and useful Improvements in Vehicle-Tires; and I do hereby declare the following to be a full, clear, and exact description of the invention, such as will enable others skilled in the art to which it appertains to make and use the same.

My invention relates to vehicle-tires in which the resiliency is due to spring metal; and the general object is to obtain the very desirable characteristics of pneumatic tires without their disadvantages.

With this object in view I provide an annular tube of thin spring metal having its outer side cut across at short intervals to form a series of semi-independent flat springs, and this tube I cover with a removable case, such as the usual tire or tire-cover of rubber and fabric, for example. The steel tube thus takes the place of the inner tube of ordinary inner-tube tires and is protected from water and dirt in the same way. The spring-metal tube is preferably made in sections formed by properly cutting metal sheets and so bending them that their opposite lateral edges overlap along the inner side of the tube. Means being provided for at will adjusting the degree of overlapping, the tube may be enlarged and made to exert an expanding force upon the cover, acting much like the inner tube of ordinary double-tube pneumatic tires.

In the accompanying drawings, Figure 1 is a side view of a portion of a wheel-rim with my tire in place, the outer cover being in part broken away. Fig. 2 is a cross-section of the rim and tire. Fig. 3 shows one of the sections of the metal tube before it is bent to tubular form. Fig. 4 is a like view of a section which may wholly replace or alternate with such sections as are shown in Fig. 3. Fig. 5 shows in perspective a device for adjusting the overlapping of the edges of a tube-section, the ordinary nipple and spoke being used within the adjusting device. Fig. 6 shows an adjusting device for use between the spokes when it is desired to avoid having adjustment involve loosening the spokes. Fig. 7 is a perspective view of a certain locking-plate. Figs. 8, 9 show, respectively, a section and a side view of a modified construction preferred to that shown in the other figures, although it is slightly more complex.

In Figs. 1, 2, 3, A represents a wheel-rim; B, the spokes; C, the nipples at the outer ends of the spokes, and D a tire-cover of the "clincher" type. Within this cover are spring-metal tube-sections, each formed by cutting sheet metal to proper form, Figs. 3, 4, slitting its middle portion, as shown at E', pressing it into proper shape, and rolling it laterally to tubular form in such manner that its free lateral margins overlap, as shown in Fig. 2. Registering slots F, serrated one upon one side and the other upon the opposite side, are cut through the overlapping portions, and through these slots and suitable perforations in the rim are passed headed tubular bolts G, each having next its head a toothed gear-like boss G' to engage the serrated edges of the slot. The end of the bolt which projects within the circle of the wheel-rim is threaded at $G^2$ and provided with a non-circular portion $G^3$ or a slot $G^4$, adapting it to be rotated by a suitable tool. The bolt being in place, rotating it in the proper direction evidently forces the overlapped portions of the tube-section oppositely outward, expanding the section against the tire-cover. While it is thus expanded, the bolt is drawn inward by a nut $G^5$, and thus engaged with a steel plate H, Figs. 2, 7, fixed in the outer surface of the rim, having serrations corresponding with the teeth of the boss, and by such engagement preventing the boss from rotating in such direction as to allow decrease in the overlapping of the tube-section. The nut being screwed firmly against the rim, the whole device is securely locked. To hold the tube-sections accurately in line, projections I may be provided to extend into adjacent sections and receive the same bolts that pass through the bodies of the latter in the manner just described, the projections being slotted and serrated at I'.

Fig. 6 shows a non-tubular bolt for use between the spokes in case a construction be desired which permits adjustment without loosening the spokes.

It is desirable to be able to connect the tube-sections before they are placed upon the rim, and to this end I sometimes employ the construction illustrated in Figs. 8, 9. Here the toothed boss is externally threaded and the shaft of the bolt is distinct from the boss, but threaded to enter an axial threaded recess in the latter. The boss, which carries the bolthead, is passed outward through the slots F, as before, and a nut $G^6$ is screwed upon its free end to bind the parts together. When the sections thus united are placed upon the rim, the bolt-shaft is passed through the rim and screwed into the boss, where it may be locked by a set-screw $G^7$. In other respects this construction is like that first described.

Obviously puncturing is not an evil pertaining to this tire, and in resiliency, in repairing, and in practical use generally it has very nearly the characteristics of pneumatic tires, including the possibility of making it hard or otherwise, according to the fancy of the user. It has also an extra advantage in that any section may be readily replaced by a new one. The thickness of the metal varies with the use to which it is to be put, it being quite thin when used as a bicycle-tire. The cover not only protects the tube within from water and grit, but also serves to distribute the force of impacts to several strips and to prevent injury to any strip by blows against hard and, perhaps, sharply-angular bodies.

Preferably the plate H is made, as shown, as a steel plate having short spurs to enter wood rims or suitable recesses in metal rims.

What I claim is—

1. An inner tire-tube of spring metal bent laterally to tubular form and having its margins overlapped, combined with means for adjusting the extent of the overlapping.

2. In an inner tire-tube, a thin sheet of spring metal cut through to form a series of strips integrally connecting uncut lateral marginal portions and curved to loosely overlap said portions and form a circular tube.

3. The combination with a suitably-perforated wheel-rim, of an inner tire-tube consisting of sections each formed from a sheet of metal cut through to form narrow transverse strips connecting uncut marginal portions and bent laterally into a tube having the uncut portions overlapped on its inner side and provided with registering slots each having teeth along one margin, bolts, adapted to be forcibly rotated, passing through the slots of the sections respectively, and having serrated portions to engage the teeth of said slots, and means for locking the bolts against rotation.

4. The combination with a metallic tiretube section consisting of a sheet of spring metal cut through to form central strips connecting uncut marginal portions each provided with a slot toothed along one margin, of a second tube-section having an uncut margin extended and provided with a similar slot in position to register with the slots of the first section when both sections are bent to tubular form and placed end to end, a suitable serrated bolt passing through the three slots, and means for locking the bolt against rotation.

In testimony whereof I affix my signature in presence of two witnesses.

RUFUS W. BROOKS.

Witnesses:
ALPHONSUS J. LINDALL,
ROBERT J. MCNALLY.